US009087286B2

(12) United States Patent
Miyamoto

(10) Patent No.: US 9,087,286 B2
(45) Date of Patent: Jul. 21, 2015

(54) IMAGE FORMATION APPARATUS AND IMAGE FORMATION SYSTEM

(75) Inventor: Tatsuya Miyamoto, Tokyo (JP)

(73) Assignee: Oki Data Corporation, Tokyo (JP)

(*) Notice: Subject to any disclaimer, the term of this patent is extended or adjusted under 35 U.S.C. 154(b) by 737 days.

(21) Appl. No.: 13/013,953

(22) Filed: Jan. 26, 2011

(65) Prior Publication Data

US 2011/0188061 A1 Aug. 4, 2011

(30) Foreign Application Priority Data

Feb. 3, 2010 (JP) .................................. 2010-022451

(51) Int. Cl.
G06F 15/16 (2006.01)
G06K 15/16 (2006.01)

(52) U.S. Cl.
CPC ..................................... G06K 15/16 (2013.01)

(58) Field of Classification Search
CPC ... G06F 3/1259; G06F 3/1203; G06F 3/1253; G06F 3/1273; G06F 3/1207; H04N 2201/3215; H04N 1/00477; H04N 1/00068; G06K 15/16; G06K 15/186
USPC ................................................ 358/1.12, 1.15
See application file for complete search history.

(56) References Cited

U.S. PATENT DOCUMENTS

| 2005/0091700 | A1* | 4/2005 | Ohno et al. | 725/133 |
| 2006/0239747 | A1* | 10/2006 | Han | 400/578 |
| 2006/0285148 | A1* | 12/2006 | Matsushima et al. | 358/1.14 |
| 2007/0019225 | A1* | 1/2007 | Digby | 358/1.14 |
| 2007/0201891 | A1* | 8/2007 | Cho | 399/67 |
| 2009/0147275 | A1* | 6/2009 | Hagiwara | 358/1.5 |

FOREIGN PATENT DOCUMENTS

| JP | 2004-336479 A | 11/2004 |
| JP | 2005-345765 A | 12/2005 |
| JP | 2006-235957 A | 9/2006 |
| JP | 2007-083593 A | 4/2007 |
| JP | 2008-299593 A | 12/2008 |
| JP | 2010-011100 A | 1/2010 |

* cited by examiner

Primary Examiner — Marivelisse Santiago Cordero
Assistant Examiner — Kent Yip
(74) Attorney, Agent, or Firm — Marvin A. Motsenbocker; MOTS LAW, PLLC

(57) ABSTRACT

An image formation apparatus includes: media containers each of which can contain therein media, an image formation unit to form an image on one or more media based on image data; a media feed unit to feed the media from one of the media containers to the image formation unit; a computation unit configured to calculate a remaining time to complete the image-forming on the media of an instructed quantity, based on a feed time per medium and a print time per medium; and an image formation condition change detector configured to detect a change of image formation conditions. When the change of the image formation conditions is detected, the computation unit calculates the remaining time, based on the feed time per medium and the print time per medium after the change of the image formation conditions.

15 Claims, 10 Drawing Sheets

FIG. 3

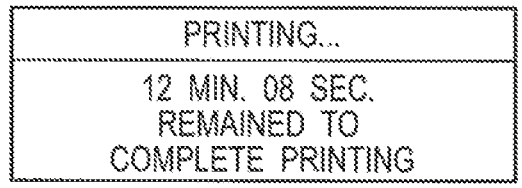

FIG. 4

| SHEET ORIENTATION | SHEET SIZE | LOCATION OF TRAY | FEED TIME |
|---|---|---|---|
| LANDSCAPE | A4 | SHEET TRAY 21a | 4 SEC. |
| LANDSCAPE | A4 | SHEET TRAY 21b | 6 SEC. |
| LANDSCAPE | A4 | SHEET TRAY 21c | 8 SEC. |
| PORTRAIT | A4 | SHEET TRAY 21a | 6 SEC. |
| ⋮ | ⋮ | ⋮ | ⋮ |

FIG. 5

| COLOR / MONOCHROME | SINGLE / DOUBLE-SIDE | PAPER ORIENTATION | SHEET SIZE | PRINT TIME |
|---|---|---|---|---|
| COLOR | SINGLE SIDE | PORTRAIT | A3 | 15 SEC. |
| COLOR | SINGLE SIDE | PORTRAIT | A4 | 12 SEC. |
| COLOR | SINGLE SIDE | LANDSCAPE | A4 | 8 SEC. |
| MONOCHROME | SINGLE SIDE | PORTRAIT | A4 | 10 SEC. |
| MONOCHROME | SINGLE SIDE | LANDSCAPE | A4 | 6 SEC. |
| MONOCHROME | DOUBLE SIDE | LANDSCAPE | A4 | 20 SEC. |
| ⋮ | ⋮ | ⋮ | ⋮ | ⋮ |

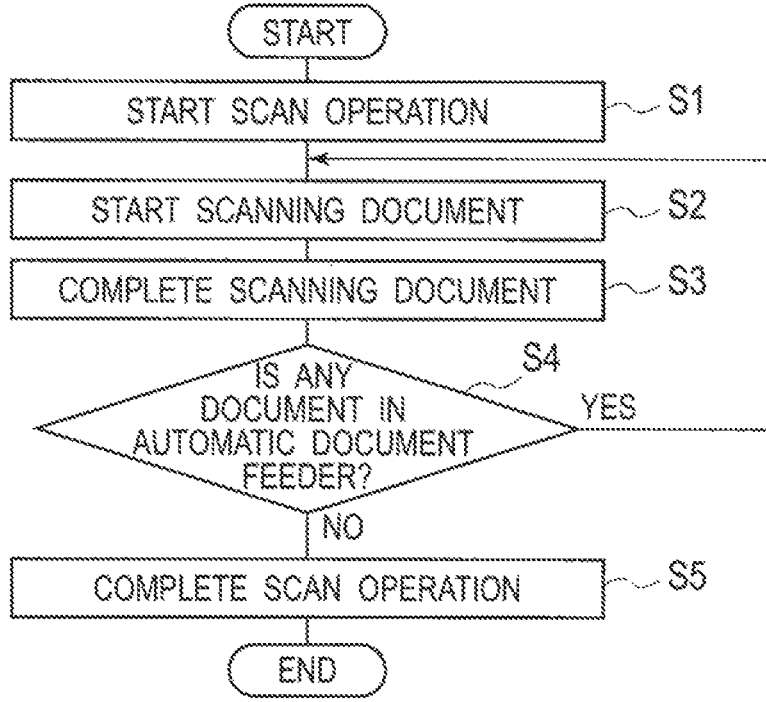
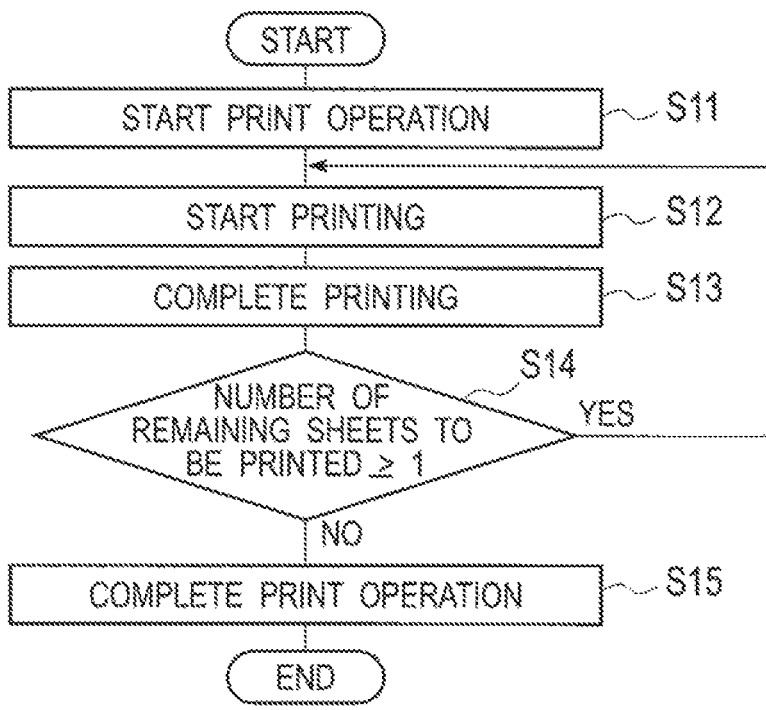

| USER NAME | PASSWORD | COMPUTER NAME | IP ADDRESS |
|---|---|---|---|
| TAROU | ABCD | COMPUTER XX | 192.168.10.1 |
| HANAKO | EFGH | COMPUTER YY | xxx.xxx.xxx.xxx |
| ⋮ | ⋮ | ⋮ | ⋮ |

IMAGE FORMATION APPARATUS AND IMAGE FORMATION SYSTEM

CROSS REFERENCE TO RELATED APPLICATIONS

This application claims priority based on 35 USC 119 from prior Japanese Patent Application No. 2010-022451 filed on Feb. 3, 2010, entitled "Image Formation Apparatus and Image Formation System," the entire contents of which are incorporated herein by reference.

BACKGROUND OF THE INVENTION

1. Field of the Invention

The invention relates to an image formation apparatus and an image formation system.

2. Description of Related Art

Among conventional image formation apparatuses such as a printer, a copy machine, a facsimile machine, or an MFP (multifunctional peripheral or printer), for example, a copy machine, reads an image of a document with a scanner unit to obtain image data thereof, converts the image data to print data, transmits the print data to an image formation unit, and forms an image according to the print data on a medium such as a sheet of paper with an image formation unit.

There has been proposed a copy machine having a function, after being instructed by an operator to execute an image formation, to calculate the remaining time to the end of the image forming process and to inform the operator of the calculated remaining time (for example, Japanese Patent Application Laid-Open No. 2005-345765).

In such copy machine, times required to complete basic operations such as a print time per sheet are stored in a memory. When the operator selects image formation conditions, which are conditions for forming the image, by using an operation unit such as an operator panel, the copy machine reads out the times of the basic operations from the memory, calculates the remaining time based on the times of the basic operations, and informs the operator of the calculated remaining time. If the image formation conditions are changed before the completion of the image forming process, the copy machine updates the remaining time.

SUMMARY OF THE INVENTION

However, the copy machine is not able to update the remaining time accurately, when an image formation condition is changed.

An object of an aspect of the invention is to provide an image formation apparatus and an image formation system capable of accurately updating the remaining time even through the image formation condition is changed before the completion of the image forming process.

An aspect of the invention is an image formation apparatus including: media containers each of which can contain therein media; an image formation unit configured to form an image on one or more media based on image data; a media feed unit configured to feed the medium from one of the media containers to the image formation unit; a computation unit configured to calculate the remaining time to complete the image-forming process on the media of an instructed quantity, based on a feed time per medium, which is the time required to feed the medium from each of the media containers to the image formation unit by the media feed unit and based on a print time per medium, which is the time required to form an image on each medium by the image formation unit; and an image formation condition change detector configured to detect a change of the image formation conditions. When the change of the image formation conditions is detected, the computation unit calculates the remaining time, based on the feed time per medium and the print time per medium after the change of the image formation conditions.

According to the aspect of the invention, based on the feed time per medium and the print time per medium, the remaining time to the end of the image-forming process on the media of the instructed quantity is calculated. When a change of the image formation conditions is detected, the remaining time under the change of the image formation conditions is calculated based on the feed time per medium and the print time per medium. Therefore, the remaining time is accurately updated.

BRIEF DESCRIPTION OF THE DRAWINGS

FIG. 3 is a view of a first display example of a display/operation unit according to the first embodiment of the invention.

FIG. 4 is a view illustrating an example of a feed time table according to the first embodiment of the invention.

FIG. 5 is a view illustrating an example of a print time table according to the first embodiment of the invention.

FIG. 8 is a flow chart illustrating a scan operation of a scanner unit according to the first embodiment of the invention.

FIG. 9 is a flow chart illustrating a print operation of the printer unit according to the first embodiment of the invention.

DETAILED DESCRIPTION OF EMBODIMENTS

Figure 1:
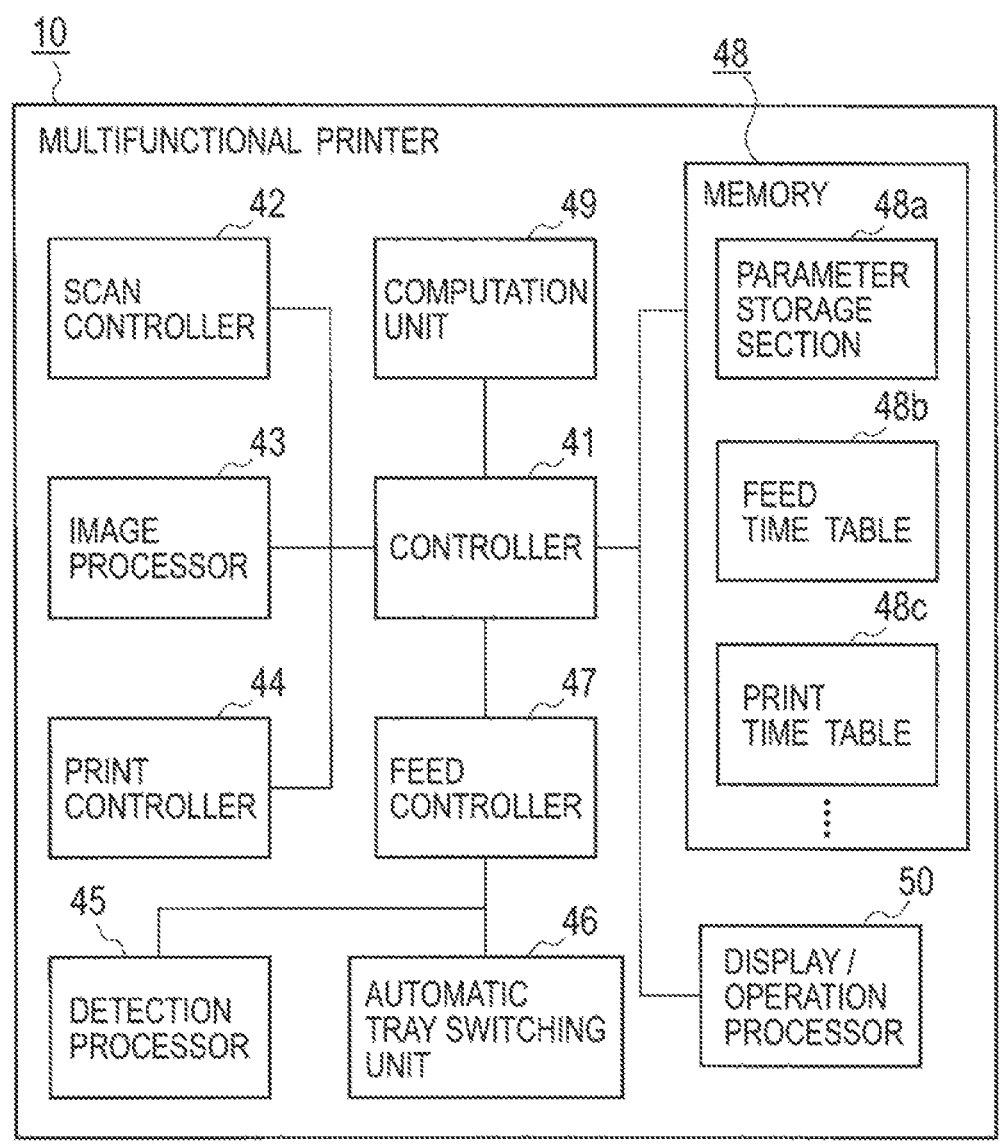
FIG. 1 is a control block diagram of a multifunction printer according to a first embodiment of the invention.

Descriptions are provided herein below for embodiments based on the drawings. In the respective drawings referenced herein, the same constituents are designated by the same reference numerals and duplicate explanation concerning the same constituents is omitted. All of the drawings are provided to illustrate the respective examples only.

A color multifunction printer serving as an image formation apparatus of the embodiments of the invention will be described below.

Figure 2:
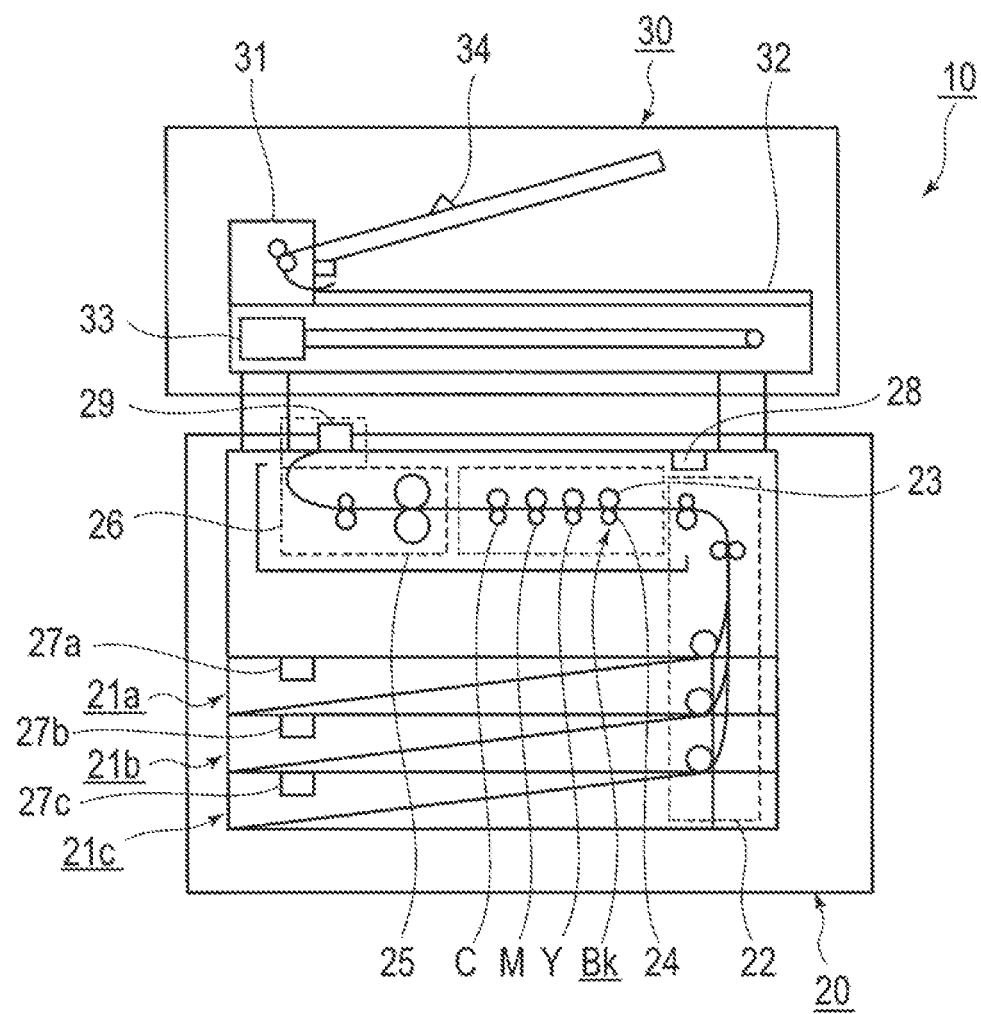
FIG. 2 is a conceptual diagram of the multifunction printer according to the first embodiment of the invention.

FIG. 2 is a conceptual diagram of the multifunction printer according to a first embodiment of the invention.

In FIG. 2, reference numeral 10 generally designates the multifunction printer. Multifunctional printer 10 has a print function and a copy function. That is, multifunctional printer 10 has printer unit 20 which executes a print operation and scanner unit 30 which executes a scan operation. When the print function is selected, multifunctional printer 10 executes printing (image forming) on sheets serving as first media based on print data that is transmitted from an unillustrated host computer serving as an external apparatus. When the copy function is selected, multifunctional printer 10 scans images on document sheets serving as second media, converts the scanned image data into print data, and executes printing on sheets based on the print data.

Printer unit 20 includes plural sheet trays (or sheet cassettes) 21a, 21b, and 21c serving as media containers each of which contains therein sheets in different sizes, sheet feed device 22 serving as a media feed unit, image formation units Bk, Y, M, and C which respectively form toner images of colors of black, yellow, magenta, and cyan and transfer the toner images onto the sheet, fixation unit 25 or a fixation device which fixes the toner images on the sheet thereby forming an image on the sheet, sheet discharge unit 26 which discharges the sheet on which the image is formed, and the like. Sheet feed device 22 feeds sheets one by one from one of sheet trays 21a, 21b, and 21c to image formation units Bk, Y, M, and C.

Sheet trays 21a, 21b, and 21c are provided with sheet detection sensors 27a, 27b, and 27c serving as first medium detectors, respectively, which detect sheets in sheet trays 21a, 21b, and 21c. Provided between sheet feed device 22 and image formation units Bk, Y, M, and C is feed sheet sensor 28, serving as a second medium detector, which detects the trailing edge (the rear end) of the sheet that is fed by sheet feed device 22. Note that sheet trays 21a, 21b, and 21c constitute a media container device. Sheet discharge unit 26 is provided with discharge sheet sensor 29, serving as a third medium detector, which detects the trailing edge of the discharged sheet.

Each image formation unit Bk, Y, M, C includes a photosensitive drum 23 serving as an image carrier, transfer roller 24, serving as a transfer member, provided opposite to photosensitive drum 23, etc. Image formation units Bk, Y, M, C form toner images, serving as developer images, of colors of black, yellow, magenta, and cyan on respective photosensitive drums 23, based on the print data transmitted to printer unit 20 as a job. Transfer rollers 24 sequentially transfer the toner images of black, yellow, magenta, and cyan from photosensitive drums 23 to the sheet, thereby forming a color toner image on the sheet.

Fixation unit 25 heats and presses the sheet with the color toner image transferred thereon, thereby fixing the color toner image to the sheet. As a result, the sheet having thereon a color image corresponding to the color toner image is obtained.

Scanner unit 30 includes automatic document feeder (ADF) 31, flatbed 32 or a platen, scan head 33 serving as an image scan unit to scan the image of the document sheet(s), document detection sensor 34 serving as a document detector to detect document sheets placed in automatic document feeder 31, and the like.

When the operator places document sheets in automatic document feeder 31 or places a document sheet on flatbed 32 and pushes an unillustrated start button or the like to scan, scan head 33 optically scans the document sheets one by one or optically scans the document sheet to measure the light intensity of a reflected light or a transmitted light and outputs the measured light intensity.

Note that the unillustrated display/operation unit which functions as a display unit and an operation unit is provided at a predetermined position in multifunctional printer 10, for example, at the top of printer unit 20. The display/operation unit includes a touch-panel type operation panel and fixed buttons such as the start button to start scanning. Note that the display/operation unit may further include an input/output unit having operation keys to input characters, numbers, and the like.

Next, a control device of multifunctional printer 10 will be described below.

FIG. 1 is a control block diagram of the multifunction printer according to the first embodiment of the invention, FIG. 3 is a view of a first display example of the display/operation unit according to the first embodiment of the invention, FIG. 4 is a view illustrating an example of a feed time table according to the first embodiment of the invention, and FIG. 5 is a view illustrating an example of a print time table according to the first embodiment of the invention.

In the drawings, reference numeral 41 designates a controller which controls the general operation of multifunctional printer 10, and reference numeral 42 designates a scan controller or a scan control unit to control scan head 33. Scan controller 42 executes a scan control process, and reads (obtains) the output of document detection sensor 34 to determine whether there is any document sheet in automatic document feeder 31.

Reference numeral 43 designates an image processor or an image processing unit to convert the light intensity output from scan head 33 into image data by an analog-digital conversion, thereby creating the image data. Reference numeral 44 designates a print controller serving as a print control processor to convert image data created by image processor 43 into print data, to transmit the print data to image formation units Bk, Y, M, and C, and to control image formation units Bk, Y, M, and C. Reference numeral 45 is a detection processor or a detection processing unit to read the outputs of sheet detection sensors 27a, 27b, and 27c and to determine whether there is any sheet in each of sheet trays 21a, 21b, and 21c. Reference numeral 46 is an automatic tray switching unit as an automatic tray switch processor to automatically switch sheet trays 21a, 21b, and 21c when there is no sheet in one of sheet trays 21a, 21b, and 21c from which sheet(s) are to be fed. Reference numeral 47 is a feed controller serving as a feed control processor to control sheet feed device 22.

Feed controller 47 executes a feeding control process, reads the output of feed sheet sensor 28 and determines that one of the sheets therein is completely fed by sheet feed device 22 when feed sheet sensor 28 detects the trailing edge of the sheet. Feed controller 47 also reads the output of discharge sheet sensor 29, and determines that one of the sheets therein is completely discharged by sheet discharge unit 26 when discharge sheet sensor 29 detects the trailing edge of the sheet.

Reference numeral 48 designates a memory. Memory 48 includes parameter storage section 48a serving as a first storage unit, feed time table 48b serving as a second storage unit, print time table 48c serving a third storage unit, and so on. Stored in parameter storage section 48a are parameters that are used in the print operation by printer unit 20, the scan operation by scanner unit 30, and the like. Stored in feed time table 48b are feed times, which are time durations required to feed one sheet by sheet feed device 22, that is, time durations required to feed one sheet from sheet trays 21a, 21b, or 21c to image formation units Bk, Y, M, and C. Stored in print time table 48c are print times, which are time durations required to form (print) images on one sheet by image formation units Bk, Y, M, C.

As shown in FIG. 4, each stored feed time is previously set, based on a tray condition serving as a first image formation condition, for example, including a sheet size (for example, A4, B5, and the like), a sheet feeding orientation indicating a landscape print mode (a orthogonal mode) wherein the longitudinal direction of the sheets is orthogonal to the sheet conveying (feeding) direction or a portrait print mode (a parallel mode) wherein the longitudinal direction of sheets is parallel to the sheet conveying (feeding) direction, a sheet tray position indicating from which sheet trays 21a, 21b, and 21c sheet(s) is to be fed.

As shown in FIG. 5, each stored print time is previously set, based on a print condition serving as a second image formation condition including a color/monochrome mode indicating whether to execute a color printing or monochrome printing, and a single/double-side print mode indicating whether to print on a single side of the sheet(s) or both sides of the sheet (s), and based on a sheet condition serving as a third image formation condition including the sheet size, and the sheet feeding orientation.

Reference numeral 49 designates a computation unit serving as an arithmetic processor to calculate remaining time, which is the time duration from the present time to the end of image formation on all of the sheets of an instructed quantity (number), that is, from the present time to the time when the print operation by printer unit 20 is finished or when the copy operation by printer unit 20 and scanner unit 30 is finished. Reference numeral 50 designates a display/operation processor or a display operation processing unit to display information of multifunctional printer 10, to inform the operator of the information by using the display/operation unit, and to receive the conditions input by the operator via the display/operation unit. Note that the information of multifunctional printer 10 includes, for example, operation status of the print operation or the scan operation in multifunctional printer 10, the remaining time, or the like.

Next, the operation of automatic tray switching unit 46 will be described below.

The operation in this embodiment will be described, assuming that sheets of A4 size are placed in sheet trays 21a and 21b in the landscape manner (the orthogonal manner) and sheets of A3 size are placed in sheet tray 21c in the portrait manner (the parallel manner). Note that, when sheets of the same size, for example, A4 size, are placed in more than one sheet trays 21a and 21b, one of the sheet trays that is located above the other, that is, sheet tray 21a in this embodiment, is priorly used.

In this case, when all the sheets in sheet tray 21a are used during the print operation, detection processor 45 determines that there is no sheet in sheet tray 21a by reading the output of sheet detection sensor 27a, and transmits, to feed controller 47, an out-of-sheet signal for sheet tray 21a, which is a signal that indicates there is no sheet in sheet tray 21a (sheet tray 21a is out of sheet). When receiving the out-of sheet signal for sheet tray 21a, feed controller 47 instructs automatic tray switching unit 46 to switch between sheet trays 21a, 21b, and 21c. When being instructed to switch between sheet trays 21a, 21b, and 21c, automatic tray switching unit 46 searches one of the sheet trays that contains sheets of A4 size. When a sheet tray that contains sheets of A4 size in the landscape manner, which is sheet tray 21b in this example, is found, automatic tray switching unit 46 switches from the previous tray (sheet tray 21a) to sheet tray 21b. As described above, since the apparatus automatically switches the sheet trays, for example, by switching to sheet tray 21a from sheet tray 21b, print controller 44 continues the print operation without suspending the print operation.

Next, the print operation of printer unit 20 will be described below, assuming that multifunctional printer 10 functions as a printer by printing based on print data of three sheets which is transmitted from the unillustarted host computer.

Figure 6:
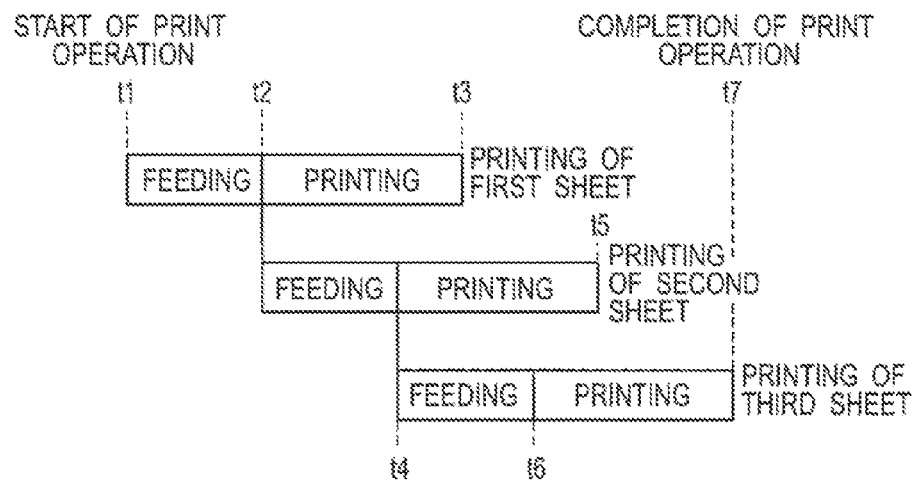
FIG. 6 is a time chart illustrating an operation of a printer unit according to the first embodiment of the invention.

FIG. 6 is a timechart illustrating the operation of printer unit 20 according to the first embodiment of the invention.

First, when the unillustarted host computer transmits print data of three-sheet printing to multifunctional printer 10, controller 41 reads out the total print sheet number (the total number of the sheets to be printed), which is three in this embodiment, that is previously set and attached in a header file of the print data, and transmits the total print sheet number, to print controller 44 and feed controller 47. Upon receiving the total print sheet number, print controller 44 executes a print control process and sets (stores) the total print sheet number in an unillustrated sheet number storage section in memory 48 serving as a fourth storage unit, as a remaining print sheet number, which is the number of remaining sheets to be printed, while feed controller 47 sets (stores) the total print sheet number in the sheet number storage section as a remaining feed sheet number, which is the number of remaining sheets to be fed.

Next, controller 41 starts the print operation. Then, feed controller 47 starts to feed the first sheet. When finishing the feeding of the first sheet, feed controller 47 subtracts the remaining feed sheet number by one and print controller 44 starts to print on the first sheet. After the printing of the first sheet is finished, print controller 44 subtracts the remaining print sheet number by one. This operation is repeated. When the remaining feed sheet number and the remaining print sheet number are both zero, controller 41 ends the print operation.

Note that in the case where multiple copies of each page (sheet) of the print data are to be printed, the total print sheet number (the total number of sheets to be printed) is calculated by multiplying the number of the pages (sheets) by the number of the multiple copies.

As shown in FIG. 6, for printing the first sheet, the feeding of the first sheet starts at time t1 and ends at time t2, and the printing on the first sheet starts at time t2 and ends at time t3. For printing the second sheet, the feeding of the second sheet starts at time t2 and ends at time t4, and the printing on the second sheet starts at time t4 and ends at time t5. For printing the third sheet the feeding of the third sheet starts at time t4 and ends at time t6, and the printing on the third sheet starts at time t6 and ends at time t7.

Note that the print operation for the three-sheet printing starts at time t1 and ends at time t7. A feed time is the time duration from the start of the feeding to the end of the feeding of each sheet, such as the time duration between time t1 and time t2, the time duration between time t2 and time t4, or the time duration between time t4 and time t6. A print time per sheet is the time duration from the start of the printing to the end of the printing of each sheet, such as the time duration between time t2 and time t3, the time duration between time t4 and time t5, and the time duration between time t6 and time t7.

Since the total print sheet number is three, print operation time period τ1 is calculated by the following formula;

$$\Sigma 1 = 3*ts+tp$$

where "τ1" represents a print operation time period, which is the time duration between time t1 and time t7, "ts" represents a feed time per sheet, and "tp" represents a print time per sheet.

Next, the operation of multifunctional printer 10 will be described in the case where three document sheets set in automatic document feeder 31 are to be copied.

Figure 7:
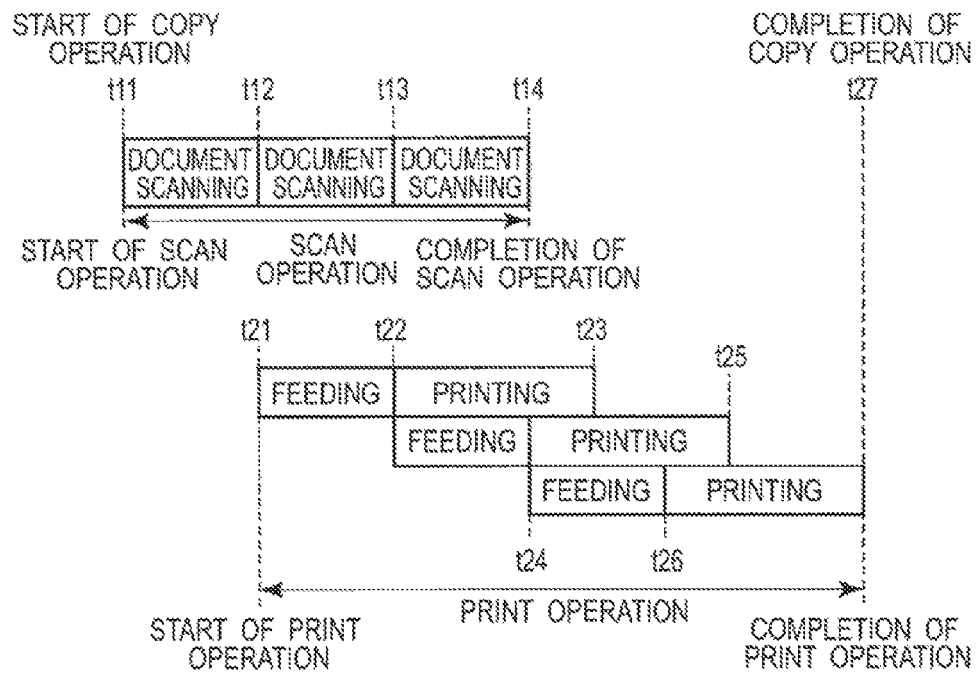
FIG. 7 is a timechart illustrating a copy operation of the multifunction printer according to the first embodiment of the invention.

FIG. 7 is a timechart illustrating the copy operation of the multifunction printer according to the first embodiment of the invention.

Note that "to copy" means to scan the image of the document sheets that are set in automatic document feeder 31 and to print the scanned image.

When the operator places document sheets in automatic document feeder 31 and instructs the multifunction printer to start a copy operation by pushing, for example, the start button, controller 41 starts the copy operation. Then, scan controller 42 starts to scan the first document sheet. When the scanning of the first document sheet ends, controller 42 increases (counts up) a scanned document sheet number, which is the number of scanned document sheets, stored in the sheet number storage section by one, while increasing (counting up) the remaining feed sheet number and the remaining print sheet number stored in the sheet number storage section by one.

When the scanning of the first document sheet ends, controller 41 starts a print operation. Feed controller 47 starts the feeding of the first sheet for printing. When the feeding of the first sheet ends, controller 47 subtracts (counts down) the remaining feed sheet number by one and print controller 44 starts the printing on the first sheet. When the printing on the first sheet ends, print controller 42 subtracts (counts down) the remaining print sheet number by one. This operation is repeated. When the document sheets placed in automatic document feeder 31 are all fed and the remaining feed sheet number and the remaining print sheet number become zero, controller 41 ends the print operation, thereby ending the copy operation.

As shown in FIG. 7, the scanning of the first document sheet starts at time t11 and ends at time t12, the scanning of the second document sheet starts at time t12 and ends at time t13, and the scanning of the third document sheet starts at time t13 and ends at time t14.

Next, for printing the first sheet, the feeding of the first sheet starts at time t21 and ends at time t22, and the printing of first sheet starts at time t22 and ends at time t23. For the printing the second sheet, the feeding of the second sheet starts at time t22 and ends at time t24 and the printing of the second sheet starts at time t24 and ends at time t25. Next, for printing the third sheet, the feeding of the third sheet starts at time t24 and ends at time t26, and the printing of the third sheet starts at time t26 and ends at time t27.

Note that the copy operation for three document sheets starts at time t11 and ends at time t27, the scan operation of the three document sheets starts at time t11 and ends at time t14, and the print operation of the three sheets starts at time t21 and ends at time t27.

Note that a scanning time period is the time duration from the start to the end of the scanning of each sheet, such as the time duration between time t11 and time t12, the time duration between time t12 and time t13, and the time duration between time t13 and time t14. A feed time is the time duration from the start to the end of the feeding of each sheet, such as the time duration between time t21 and time t22, the time duration between times t22 and t24, the time duration between time t24 and time t26. A print time per sheet is the time duration from the start to the end of the printing of each sheet, such as the time duration between time t22 and time t23, the time duration between time t24 and time t25, and the time duration between time t26 and time t27.

Since the total print sheet number is three, print operation time period τ11 is calculated by the following formula (1);

$$\tau 11 = 3*ts+tp \quad (1)$$

where "τ11" represents a print operation time period, which is the time duration between time t21 and t27, "tp" represents the feed time per sheet, and "ts" represents the print time per sheet.

Total print sheet number NT, which is the number of the sheets to be printed based on an instruction in a copy operation (a job), is calculated by the following formula (2);

$$NT=Nc*v \quad (2)$$

where "Nc" represents the number of document sheets, that is, the number of document sheets to be scanned, and "v" represents the number of copies to be made for each sheet.

Remaining print sheet number Na, which is the number of remaining sheets to be printed as of time t14 when the scan operation ends is calculated by the following formula (3);

$$Na=NT-Nb \quad (3)$$

where "Nb" represents a printed sheet number, which is the number of sheets that has printed as of time t14, when the scanning operation ends.

Next, the operation of multifunctional printer 10 will be described in the case where ten A4-size document sheets are set in automatic document feeder 31, and the images of the document sheets are color-copied on a single side of the sheets.

FIG. 8 is a flow chart illustrating the scan operation of the scanner unit according to the first embodiment of the invention, and FIG. 9 is a flow chart of the print operation of the print unit according to the first embodiment of the invention.

First, when the operator sets (places) ten A4-size document sheets in automatic document feeder 31, sets (inputs) "20" as the number of copies to be made, "color" and "single side" as the print condition, and then pushes the start button to start copying by operating the display/operation unit, scan controller 42 records the number of copies to be made and the print condition to parameter storage section 48a and starts the scan operation by using scanner unit 30, thereby starting the scanning of the first document sheet. Whenever the scanning of one of the document sheets ends, scan controller 42 increases (counts up) the scanned document sheet number, which is the number of scanned document sheets, by one. This scan operation is repeated until all the document sheets set in automatic document feeder 31 are gone (scanned). Thus, when all the document sheets in automatic document feeder 31 are gone, the scan operation ends.

Meanwhile, when the scanning of the image of the first document sheet ends, print controller 44 starts the print operation, starting the printing on the first sheet. When the printing on the first sheet ends, print controller 44 increases (counts up) the printed sheet number, which is the number of sheets that have been printed, by one and subtracts (counts down) the remaining print sheet number, which is the number of remaining sheets that are to be printed, by one. In this case, since the A4-size sheets are set in sheet trays 21*a* and 21*b* and sheet trays 21*a* is provided above sheet tray 21*b*, the multifunction printer priorily uses sheet tray 21*a* to feed A4-size sheets from sheet tray 21*a*.

The print operation is repeated until the remaining print sheet number becomes zero. When the remaining print sheet number becomes zero, controller 41 ends the print operation, thereby ending the copy operation.

Next, the flowchart shown in FIG. 8 will be described.

Step S1: Step S1 starts a scan operation.

Step S2: Step S2 starts scanning of a document sheet.

Step S3: Step S3 ends the scanning of the document sheet.

Step S4: Step S4 determines whether or not there is any document sheet in automatic document feeder 31. When there is one or more document sheets in automatic document feeder 31, the process proceeds back to step S2. When there is no document sheet in automatic document feeder 31, the process proceeds to step S5.

Step S5: Step S5 finishes the scan operation, thereby ending the process.

Next, the flowchart shown in FIG. 9 will be described.

Step S11: Steps S11 starts a print operation.

Step S12: Step S12 starts printing on a sheet.

Step S13: Step S13 ends printing on the sheet.

Step S14: Step S14 determines whether or not the remaining print sheet number is one or more. When the remaining print sheet number is one or more (Yes, in step S14), the process proceeds back to step S12. When the remaining print sheet number is zero (No, in step S14), the process proceeds to step S15.

Step S15: Step S15 finishes the print operation, thereby ending the process.

Note that when all of the document sheets set in automatic document feeder 31 are gone (scanned) and the scanning process ends, scanned document sheet number Nc, which is the number of scanned document sheets, is determined and thus it enables the multifunction printer to calculate a remaining time to complete the copy operation.

Therefore, the first embodiment calculates the remaining time based on scanned document sheet number Nc and notifies the calculated remaining time to the operator.

Figure 10:
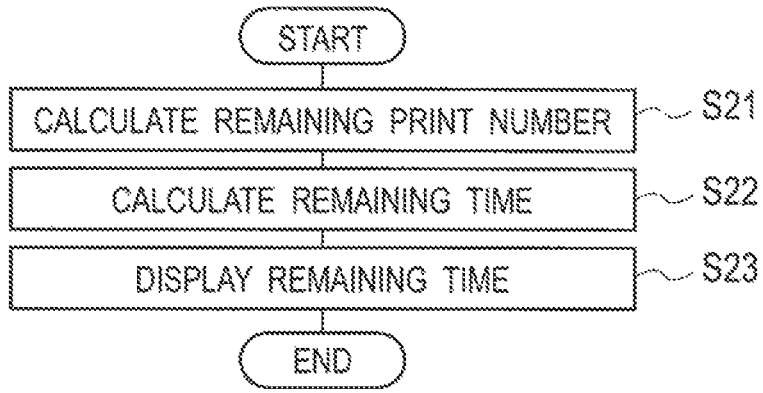
FIG. 10 is flow chart (1) illustrating operation of a computation unit and a display/operation processor according to the first embodiment of the invention.

FIG. 10 is flowchart (1) illustrating the operation of the computation unit and the display/operation processor according to the first embodiment of the invention.

First, computation unit 49 executes a computing process, reads the output of document detection sensor 34, and determines whether or not there are one or more document sheets in automatic document feeder 31. When all the document sheets set in automatic document feeder 31 are gone, computation unit 49 determines that the scan operation is finished, reads scanned document sheet number Nc and printed sheet number Nb as of the end of the scan operation from the sheet number storage section, and reads copy number v (the number of copies to be made) from parameter storage section 48*a*.

Next, computation unit 49 calculates total print sheet number NT, which is the number of the sheets to be printed, based on the above-described formula (2), calculates remaining print sheet number Na based on the above-described formula (3), and then records remaining print sheet number Na to the sheet number storage section.

Then, computation unit 49 reads remaining print sheet number Na from the sheet number storage section, feed time is per sheet from feed time table 48*b*, print time tp per sheet from print time table 48*c*, calculates remaining time Tα based on following formula (4) obtained based on above-described formula (1), and records calculated remaining time Tα to an unillustrated remaining time storage section in memory 48 serving as a fifth storage unit.

$$T\alpha = Na * ts + tp \tag{4}$$

Since twenty copies of ten document sheets are to be produced in this example, scanned document sheet number Nc is 10 (sheets) and total print sheet number NT is calculated as below.

$$NT = 10 * 20$$
$$= 200 \text{(sheets)}$$

Where printed sheet number Nb, which is the number of sheets that is printed, as of the end of the scan operation is 20 (sheets), remaining print sheet number Na is calculated as below.

$$Na = 200 - 20$$
$$= 180 \text{(sheets)}$$

In this case, the feed time per sheet is 4 seconds and the print time per sheet is 8 seconds since the sheet orientation is the landscape manner (the orthogonal manner), the sheet size is A4 size, color/monochrome print mode is the color print mode, the tray position is sheet tray 21*a*, and single/double side print mode is the single side.

Therefore, remaining time Tα is calculated as follows.

$$T\alpha = 180 * 4 + 8$$
$$= 728 \text{ seconds}$$
$$= 12 \text{ minutes and } 8 \text{ seconds}$$

Next, display/operation processor 50 reads remaining time Tα from the remaining time storage section and displays remaining time Tα by using the display/operation unit as shown in FIG. 3, so as to notify remaining time Tα to the operator.

Next, the flowchart will be described.

Step S21: Step S21 calculates remaining print sheet number Na.

Step S22: Step S22 calculates remaining time Tα.

Step S23: Step S23 displays remaining time Tα on the display/operation unit, and ends the process.

Next, the operation of computation unit 49 and display/operation processor 50 will be described, in the case where sheet tray 21*a* runs out of sheets during a print operation and sheet tray 21*a* is switched to sheet tray 21*b*.

Figure 11:
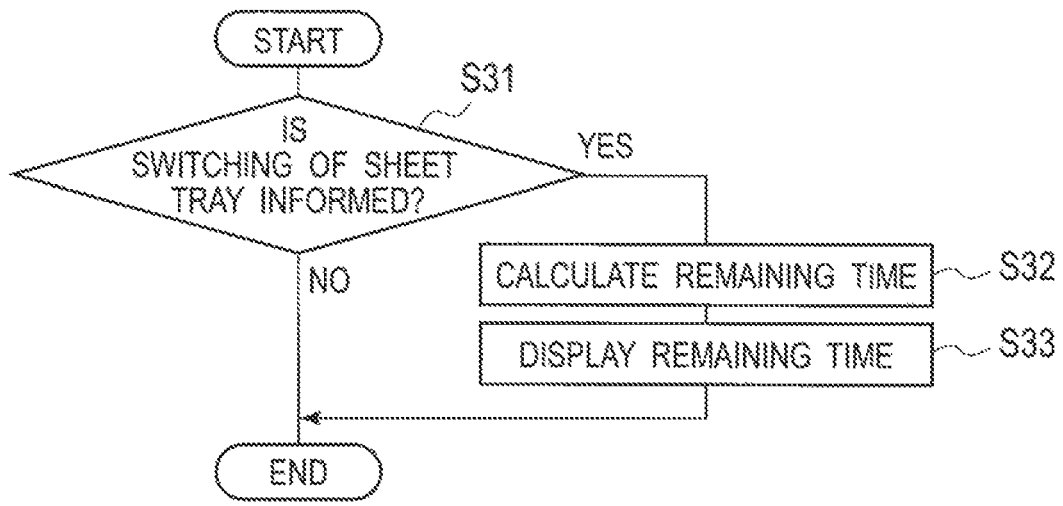
FIG. 11 is flow chart (2) illustrating the operation of the computation unit and the display/operation processor according to the first embodiment of the invention.
Figure 12:
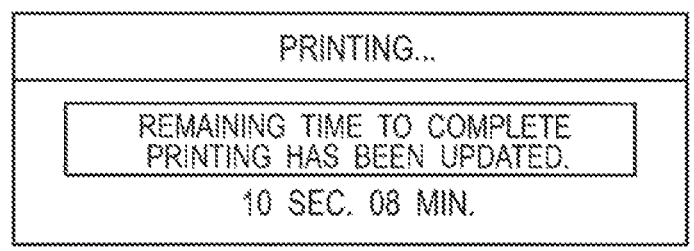
FIG. 12 is a view of a second display example of the display/operation unit according to the first embodiment of the invention.

FIG. 11 is flowchart (2) illustrating the operation of the computation unit and the display/operation processor according to the first embodiment of the invention. FIG. 12 is a second display example of the display/operation unit according to the first embodiment of the invention.

As described above, when detection processor 45 determines that sheet tray 21*a* runs out of the sheets and transmits an out-of-sheet signal indicating there is no sheet in sheet tray 21*a* to feed controller 47, automatic tray switching unit 46 searches for a sheet tray that contains therein A4-size sheets, finds sheet tray 21*b*, and switches the sheet tray from sheet tray 21a to sheet tray 21b. Controller 41 notifies the switch of the sheet trays to computation unit 49. Note that in this embodiment, automatic tray switching unit 46 functions as an image formation condition change detector and detects the switch of the sheet trays as a change of the tray condition.

When computation unit 49 receives the information of the switch of the sheet trays, computation unit 49 updates the remaining time. In this case, remaining print sheet number Na' is calculated by the following formula (5);

$$Na'=NT-Nb' \quad (5)$$

where Nb' represents the number of sheets that is printed before the switch of the sheet trays.

Then, computation unit 49 reads remaining print sheet number Na' from the sheet number storage section, reads from feed time table 48b feed time ts' per sheet applied after the switch of the sheet trays, reads from print time table 48c print time tp' per sheet applied after the switch of the sheet trays, calculates the remaining time Tβ based on following formula (6), and records calculated remaining time Tβ to the remaining time storage section.

$$T\beta = Na'*ts' + tp' \quad (6)$$

For example, if printed sheet number Nb' before the switch of the sheet trays is 100 (sheets), remaining time Tα, displayed on the display/operation unit, just before the switch of the sheet trays is 6 [minutes] and 48 [seconds].

In this case, after the switch of the sheet trays, the feed time per sheet is 6 seconds and the print time per sheet is 8 seconds since the sheet orientation is the landscape manner (the orthogonal manner), the sheet size is A4 size, the color/monochrome print mode is the color print, the tray position is sheet tray 21b, and single/double-side print mode is the single-side print.

Therefore, remaining time Tβ is calculated as below.

$$T\beta = 100 * 6 + 8$$
$$= 608 \text{ seconds}$$
$$= 10 \text{ minutes and } 8 \text{ seconds}$$

Next, display/operation processor 50 reads remaining time Tβ from the remaining time storage section and displays a message indicating that the remaining time has been updated and updated remaining time Tβ on the display/operation unit as shown in FIG. 12 so as to inform the operator of the updated information.

Next, the flowchart will be described.

Step S31: Step S31 determines whether or not a switch of the sheet trays is informed. When the switch of the sheet trays is informed (Yes in step 31), the process proceeds to step S32. When the switch of the sheet trays is not informed (No in step 31), the process ends.

Step S32: Step 32 calculates remaining time Tβ.

Step S33: Step 33 displays remaining time Tβ on the display/operation unit and ends the process.

As described above, even through the tray condition, the print condition, the sheet condition, or the like is changed (for example, the sheet trays are switched) during a print operation, this embodiment is capable of calculating remaining time Tβ according to the tray condition, the print condition, the sheet condition, and the like (for example, the switch of the sheet trays), thereby updating remaining time Tβ accurately. As a result, the operator can confirm the accurate remaining time.

Next, a second embodiment of the invention will be described. Note that, in the second embodiment, the same reference numerals will be given to the same components as those in the first embodiment, and description of the structure and the effect of these same components will be omitted.

Figure 13:
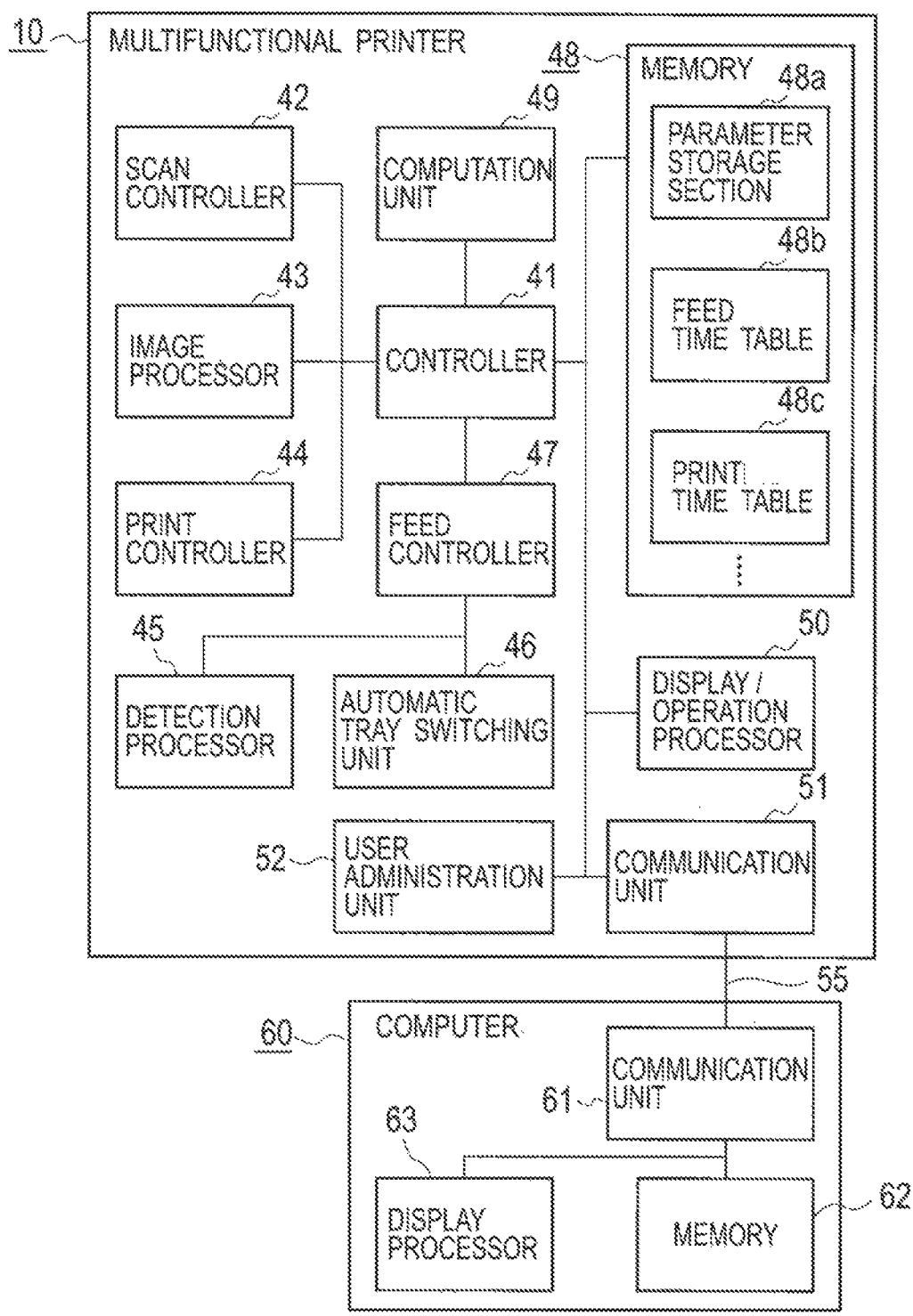
FIG. 13 is a control block diagram of a multifunction printer according to a second embodiment of the invention.
Figures 14, 15:
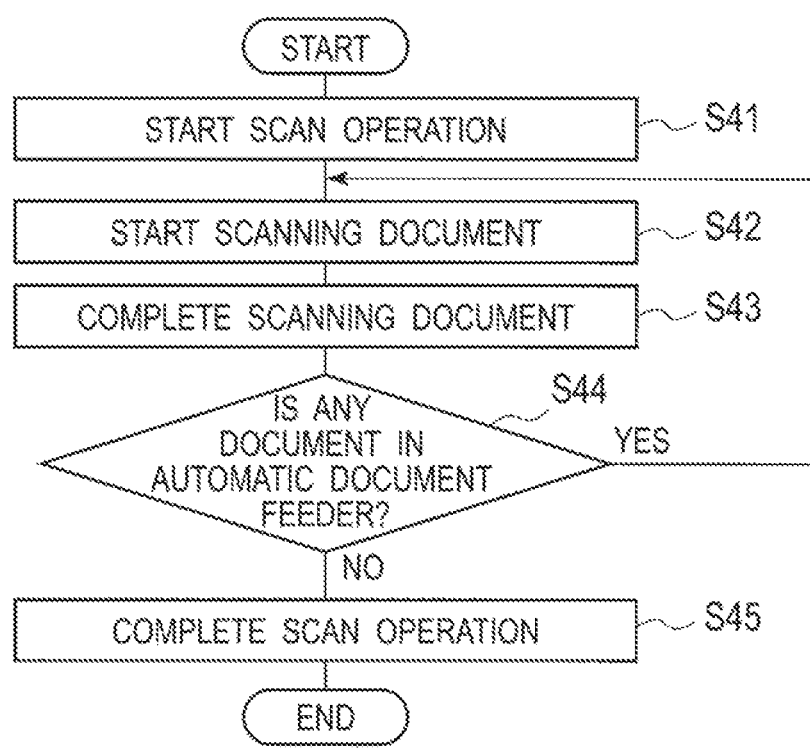
FIG. 14 is a view of an example of a login user table according to the second embodiment of the invention.
FIG. 15 is a flow chart illustrating a scan operation of a scanner unit according to the second embodiment of the invention.

FIG. 13 is a control block diagram of a multifunctional printer according to the second embodiment of the invention. FIG. 14 is a view of an example of a login user table according to the second embodiment of the invention In the second embodiment, multifunctional printer 10 and network interface 55 make up an image formation system such that multifunctional printer 10 serving as an image formation apparatus is connected to plural computers 60 serving as a host apparatus or an external apparatus via network interface 55. Note that FIG. 13 illustrates only one of computers 60. Thus, multifunctional printer 10 includes communication unit 51 serving as a communication processor which controls communications with computers 60. Multifunctional printer 10 includes user administration unit 52 serving as a user administration processor. User administration unit 52 authenticates the validity of an operator (executes a user authentication) and controls logged-in users, which are the authenticated operators. User administration unit 52 includes the login user table serving as a sixth storage unit for authorizing users. As shown in FIG. 14, a password, a computer name which is the name of computer 60 belonging to the operator, an IP address of computer 60, and the like are recorded in the login user table, corresponding to the name of each operator.

Computer 60 includes communication unit 61 which controls communication with multifunctional printer 10, memory 62 serving as a seventh storage unit which stores therein the remaining time transmitted from multifunctional printer 10, and display processor 63 or a display processing unit which displays the remaining time stored in memory 62 on an unillustrated display panel. Computer 60 is equipped with the unillustrated display panel serving as a display at a predetermined position.

Next, the operation of multifunctional printer 10 will be described in the case where multifunctional printer 10 executes a color copy on the single side of sheets as the first media.

First, when the operator inputs, by using the display/operation unit, for example, "TAROU" as a user name and "ABCD" as a password, user administration unit 52 executes the user administration process referring to the login user table, and determines whether the input user name and password coincide with a name and password in the login user table. When the input user name and password coincide with a name and password in the login user table, user administration unit 52 determines that the user name is "TAROU", the password is "ABCD, the computer name is "computer XX", and the IP address is "192.168.10.1", thereby authorizing the operator.

Next, the scan operation of scanner unit 30 and the print operation of printer unit 20 will be described.

Figure 16:
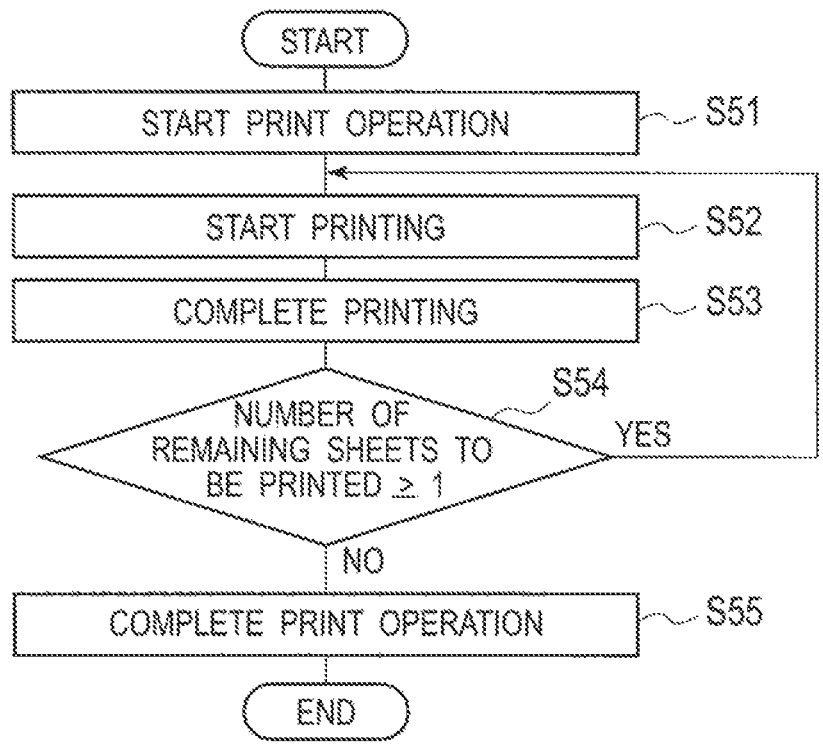
FIG. 16 is a flow chart illustrating a print operation of a printer unit according to the second embodiment of the invention.

FIG. 15 is a flowchart illustrating the scan operation of the scanner unit according to the second embodiment of the invention. FIG. 16 is a flowchart illustrating the print operation of the printer unit according to the second embodiment of the invention.

First, the logged-in user (that is, the authorized operator) places ten A4-size document sheets in automatic document feeder 31, sets (inputs) "20" as the number of copies, "color" and "single-side" as the print condition by operating the display/operation unit, and pushes the start button to start copying. Accordingly, like the first embodiment, scan controller 42 serving as a scan control processor repeats the scan operation until all the document sheets set in automatic document feeder 31 are gone, and ends the scan operation when all the document sheets set in automatic document feeder 31 are gone.

Meanwhile, print controller 44 serving as a print control processor repeats the print operation until the remaining print sheet number becomes zero, and then ends the print operation when the remaining print sheet number becomes zero, thereby ending the copy operation.

Next, the flowchart shown in FIG. 15 will be described.

Step S41: Step S41 starts a scan operation.
Step S42: Step S42 starts scanning of a document sheet.
Step S43: Step S43 ends the scanning of the document sheet.
Step S44: Step S44 determines whether there are any document sheets in automatic document feeder 31. When there are one or more document sheets in automatic document feeder 31 (Yes in step S44), the process proceeds back to step S42. When there is no document sheet in automatic document feeder 31 (No in step S44), the process proceeds to step S45.
Step S45: Step S45 ends the scan operation, and thereby ending the process.

Next, the flowchart shown in FIG. 16 will be described.

Step S51: Step S51 starts a print operation.
Step S52: Step S52 starts printing on a sheet.
Step S53: Step S53 ends the printing on the sheet.
Step S54: Step S54 determines whether the remaining print sheet number is more than zero. When the remaining print sheet number is one or more (Yes in step S54), the process proceeds back to step S52. When the remaining print sheet number is zero (No in step S54), the process proceeds to step S55.
Step S55: Step S55 ends the print operation thereby ending the process.

Next, the operation of computation unit 49 and communication unit 51 will be described. Computation unit 49 serving as a computing processor is configured to calculate the remaining time to the end of the copy operation after the scan operation ends (after the document sheets set in automatic document feeder 31 are all scanned).

Figure 17:
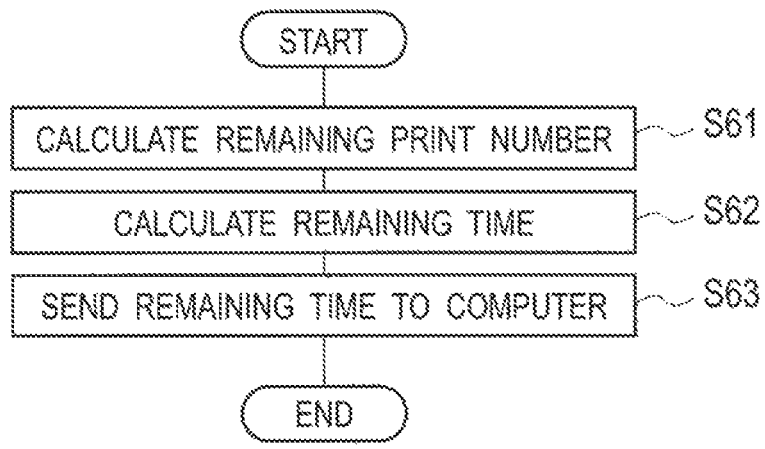
FIG. 17 is a flow chart (1) illustrating operation of a computation unit and a communication unit according to the second embodiment of the invention.

FIG. 17 is flowchart (1) illustrating the operation of the computation unit and the communication unit according to the second embodiment of the invention.

First, when it is determined that all the document sheets set in automatic document feeder 31 are gone, computation unit 49 determines that the scan operation ends and calculates total print sheet number NT based on described formula (2) and remaining print sheet number Na based on described formula (3), and stores calculated remaining print sheet number Na to the sheet number storage section serving as the fourth storage unit.

Next, computation unit 49 calculates remaining time Tα based on described formula (4) and stores calculated remaining time Tα to the remaining time storage section serving as the fifth storage unit.

Then, communication unit 51 executes a communication process, reads out remaining time Tα from the remaining time storage section, and transmits remaining time Tα to computer 60 of the logged-in user.

When computer 60 receives remaining time Tα from multifunctional printer 10, display processor 63 executes a display process, displaying remaining time Tα on the display panel to inform the logged-in user of remaining time Tα.

Next, the flowchart will be described.

Step S61: Step S61 calculates remaining print sheet number Na.
Step S62: Step S62 calculates remaining time Tα.
Step S63: Step S63 transmits remaining time Tα to computer 60, and ends the process.

Next, the operation of computation unit 49 and communication unit 51 will be described in the case where sheet tray 21a serving as the media container runs out of sheets during a print operation and the sheet tray is switched from sheet tray 21a to sheet tray 21b.

Figure 18:
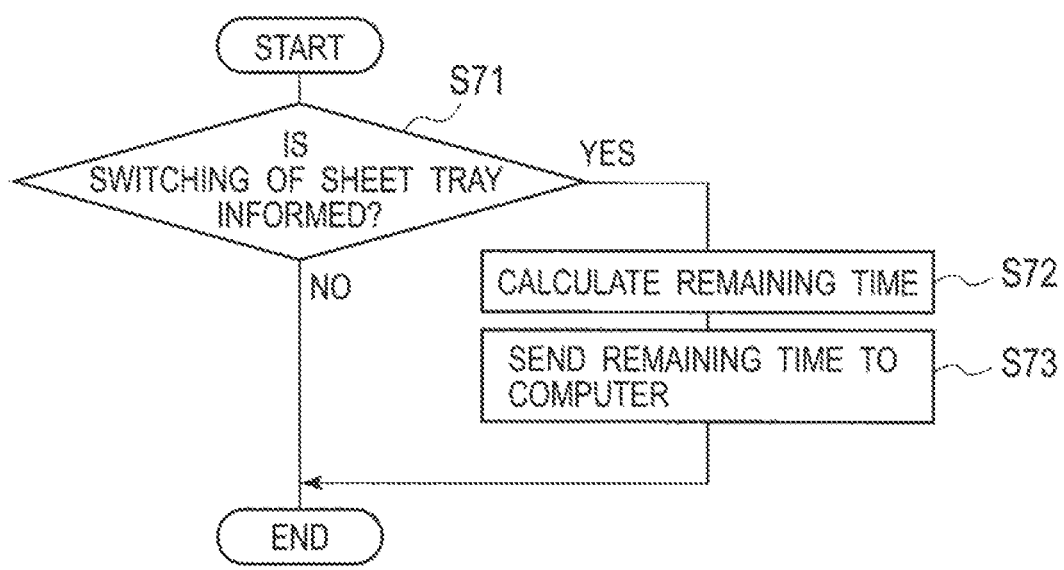
FIG. 18 is a flow chart (2) illustrating the operation of the computation unit and the communication unit according to the second embodiment of the invention.

FIG. 18 is flowchart (2) illustrating the operations of the computation unit and the communication unit according to the second embodiment of the invention.

When controller 41 notifies the switch of the sheet trays to computation unit 49, computation unit 49 reads out remaining print sheet number Na' from the sheet number storage section, feed time ts' per sheet after the switch of the sheet trays from feed time table 48b serving as the second storage unit, print time tp' per sheet after the switch of the sheet trays from print time table 48c serving as the third storage unit, calculates remaining time Tβ based on above formula (6), and stores remaining time Tβ to the remaining time storage section.

Next, communication unit 61 reads out remaining time Tβ from the remaining time storage section, and transmits, to computer 60 of the logged-in user, information that remaining time Tβ has been updated and updated remaining time Tβ.

When computer 60 receives, from multifunctional printer 10, updated remaining time Tβ and the information that remaining time Tβ has been updated, display processor 63 displays updated remaining time Tβ and a message that remaining time Tβ has been updated on the display panel, so as to inform the logged-in user of them.

Next, the flowchart will be described.

Step S71: Step S71 determines whether or not a switch of the sheet trays is informed. When a switch of the sheet trays is informed (Yes in step S71), the process proceeds to step S72. When no switch of the sheet trays is informed (No in step S71), the process ends.

Step S72: Step S72 calculates remaining time Tβ.
Step S73: Step S73 transmits remaining time Tβ to computers 60 and ends the process.

Accordingly, in the second embodiment, the logged-in user can confirm remaining time Tα or Tβ to the end of the print operation or the end of the copy operation instructed by the logged-in user by using the display panel of the computer of the logged-in user without using the display/operation unit of multifunctional printer 10. Thus, the logged-in user can easily check remaining time Tα or Tβ.

The above embodiments describe application of the invention to multifunctional printer 10 as an image formation apparatus. The invention is also applicable to other image formation apparatus, such as a printer, a copier, a facsimile, or the like.

Note that the invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:
1. An image formation apparatus comprising:
media containers each of which can contain therein media;
an image formation unit that forms an image on one or more of the media based on image data;
a media feed unit that feeds the media from one of the media containers to the image formation unit;

a feed medium detector provided between the media feed unit and the image formation unit, and which detects each one of the media;

a computation unit that calculates a remaining time to complete the image-forming on the media of an instructed quantity, based on a feed time per medium, which is the time length required to feed the medium from each of the media containers to the image formation unit by the media feed unit and based on a print time per medium, which is the time length required to form an image on each medium by the image formation unit, the remaining time being recalculated by the computation unit each time the feed medium detector detects a tail end of each one of the media that indicates that the feeding of the respective one of the media is completed;

a display/operation processor that displays the remaining time on a display;

an image formation condition change detector that detects a change of image formation conditions for printing the media by the image formation apparatus;

a document feeder that feeds document sheets set in the document feeder to an image scan unit;

an image scan unit that scans the document sheets fed by the document feeder;

a scan controller that controls scanning of the document sheets by the image scan unit; and a discharge medium sensor provided downstream of the image formation unit, wherein when the change of the image formation conditions is detected, the computation unit calculates the remaining time, based on the feed time per medium and the print time per medium after the change of the image formation conditions, wherein the display/operation processor causes, when the remaining time is calculated to obtain an updated remaining time after the change of the image formation conditions and in which the updated remaining time is displayed on the display, to further having displayed on the display a first indication indicating, via words, that the remaining time has been updated, wherein the first indication is different from a second indication that is displayed with the remaining time on the display before the image formation conditions have been changed, wherein the image formation conditions are conditions that have changed for the image formation apparatus that is to perform the image-forming on the media and that was initially sent a print job to perform the image-forming on the media, wherein the scan controller increases by one, when the discharge medium sensor detects the tail end of each one of the media during the scanning operation, a count value corresponding to a discharged number of printed media, wherein the scan controller calculates, when all of the document sheets set in the document feeder have been fed out of the document feeder, the total number of media to be printed, by subtracting the count value corresponding to the discharged number of printed media from a result obtained by multiplying the number of the scanned document sheets and the number of copies to be performed on each of the document sheets, and wherein the computation unit calculates the remaining time to complete the image-forming accordingly.

2. The image formation apparatus according to claim 1, further comprising:

a storage unit in which the feed time per medium and the print time per medium are stored and previously set corresponding to each of the image formation conditions.

3. The image formation apparatus according to claim 1, wherein the image formation condition change detector detects a switch of the media containers as a change of the image formation conditions.

4. The image formation apparatus according to claim 1, wherein the remaining time is recalculated based on the media in the second one of the media containers being oriented in a different manner as the media of the same type in the first one of the media containers.

5. The image formation apparatus according to claim 1, wherein the updated remaining time is displayed by using a numerical number and a measure of time, and wherein the first indication and the updated remaining time are concurrently displayed on first and second lines on the display, respectively.

6. The image formation apparatus according to claim 5, wherein the first line and the second line are displayed adjacently on the display.

7. The image formation apparatus according to claim 6, wherein the first line and the second line are displayed next to each other on the display.

8. The image formation apparatus according to claim 5, wherein the measure of time comprises a display of only minutes or a display of only seconds.

9. The image formation apparatus according to claim 1, wherein the computation unit recalculates the remaining time to complete the image-forming by subtracting a value corresponding to the feed time per medium from a most recently-computed remaining time to complete the image-forming.

10. An image formation apparatus comprising:

media containers each of which can contain therein media;

an image formation unit that forms an image on one or more of the media based on image data included in a job;

a media feed unit that feeds the media from one of the media containers to the image formation unit;

a feed medium detector provided between the media feed unit and the image formation unit, and which detects each one of the media;

a computation unit that calculates a remaining time to complete the job, based on a feed time per medium, which is the time length required to feed the medium from each of the media containers to the image formation unit by the media feed unit and based on a print time per medium, which is the time length required to form an image on each media by the image formation unit, the remaining time being recalculated by the computation unit each time the feed medium detector detects a tail end of each one of the media that indicates that the feeding of the respective one of the media is completed;

a display/operation processor that displays the remaining time on a display;

an image formation condition change detector that detects a change of image formation conditions;

a document feeder that feeds document sheets set in the document feeder to an image scan unit;

an image scan unit that scans the document sheets fed by the document feeder;

a scan controller that controls scanning of the document sheets by the image scan unit; and a discharge medium sensor provided downstream of the image formation unit, wherein when the change of the image formation conditions is detected, the computation unit calculates the remaining time, based on the feed time per medium and the print time per medium after the change of the image formation conditions, wherein the display/operation processor causes, when the remaining time is calculated to obtain an updated remaining time after the change of the image formation conditions and in which the updated remaining time is displayed on the display, to further having displayed on the display a first indication indicating, via words, that the remaining time has been updated, wherein the first indication is different from a second indication that is displayed with the remaining time on the display before the image formation conditions have been changed, wherein the image formation conditions are conditions that have changed for the image formation apparatus that is to perform the image-forming on the media and that was initially sent a print job to perform the image-forming on the media, wherein the scan controller increases by one, when the discharge medium sensor detects the tail end of each one of the media during the scanning operation, a count value corresponding to a discharged number of printed media, wherein the scan controller calculates, when all of the document sheets set in the document feeder have been fed out of the document feeder, the total number of media to be printed, by subtracting the count value corresponding to the discharged number of printed media from a result obtained by multiplying the number of the scanned document sheets and the number of copies to be performed on each of the document sheets, and wherein the computation unit calculates the remaining time to complete the image-forming accordingly.

11. The image formation apparatus according to claim 10, wherein the remaining time is recalculated based on the media in the second one of the media containers being oriented in a different manner as the media of the same type in the first one of the media containers.

12. The image formation apparatus according to claim 10, wherein the updated remaining time is displayed by using a numerical number and a measure of time, and wherein the first indication and the updated remaining time are concurrently displayed on first and second lines on the display, respectively.

13. The image formation apparatus according to claim 12, wherein the first line and the second line are displayed adjacently on the display.

14. The image formation apparatus according to claim 13, wherein the first line and the second line are displayed next to each other on the display.

15. The image formation apparatus according to claim 12, wherein the measure of time comprises a display of only minutes or a display of only seconds.

\* \* \* \* \*